United States Patent
Bajan

(10) Patent No.: US 8,543,495 B1
(45) Date of Patent: Sep. 24, 2013

(54) ONLINE ELECTRONIC TRANSACTION AND FUNDS TRANSFER METHOD AND SYSTEM

(75) Inventor: Joseph Peter Bajan, Nanaimo (CA)

(73) Assignee: E. E. System Corporation, Nanaimo (CA)

( * ) Notice: Subject to any disclaimer, the term of this patent is extended or adjusted under 35 U.S.C. 154(b) by 611 days.

(21) Appl. No.: 09/667,621

(22) Filed: Sep. 22, 2000

Related U.S. Application Data

(63) Continuation-in-part of application No. 09/592,901, filed on Jun. 12, 2000.

(51) Int. Cl.
*G06Q 40/00* (2012.01)

(52) U.S. Cl.
USPC .............................. 705/39; 705/40

(58) Field of Classification Search
USPC ................................ 705/26, 35–44
See application file for complete search history.

(56) References Cited

U.S. PATENT DOCUMENTS

| | | | |
|---|---|---|---|
| 5,689,100 A * | 11/1997 | Carrithers et al. ............ 235/380 |
| 5,845,265 A | 12/1998 | Woolston |
| 5,897,621 A * | 4/1999 | Boesch et al. .................. 705/26 |
| 5,903,878 A * | 5/1999 | Talati et al. ...................... 705/26 |
| 5,991,748 A * | 11/1999 | Taskett ............................ 705/41 |
| 6,023,685 A | 2/2000 | Brett et al. |
| 6,058,380 A * | 5/2000 | Anderson et al. ............... 705/40 |
| 6,105,008 A * | 8/2000 | Davis et al. ..................... 705/41 |
| 6,169,975 B1 * | 1/2001 | White et al. .................... 705/44 |
| 6,185,545 B1 * | 2/2001 | Resnick et al. ................. 705/40 |
| 6,216,115 B1 * | 4/2001 | Barrameda et al. ............. 705/40 |
| 6,311,170 B1 * | 10/2001 | Embrey .......................... 705/40 |
| 6,327,577 B1 * | 12/2001 | Garrison et al. ................ 705/40 |
| 6,339,766 B1 * | 1/2002 | Gephart .......................... 705/44 |
| 6,341,273 B1 * | 1/2002 | Briscoe .......................... 705/41 |
| 6,405,182 B1 * | 6/2002 | Cuervo .......................... 705/43 |
| 6,467,684 B2 * | 10/2002 | Fite et al. ....................... 235/379 |
| 6,760,470 B1 | 7/2004 | Bogosian et al. |
| 6,970,843 B1 * | 11/2005 | Forte .............................. 705/39 |
| 7,003,485 B1 | 2/2006 | Young |
| 7,089,208 B1 * | 8/2006 | Levchin et al. ................ 705/39 |
| 7,177,836 B1 | 2/2007 | German et al. |
| 7,249,097 B2 | 7/2007 | Hutchison et al. |
| 7,461,022 B1 | 12/2008 | Churchill et al. |
| 7,483,856 B2 | 1/2009 | Likourezos et al. |
| 7,512,563 B2 | 3/2009 | Likourezos et al. |
| 7,567,937 B2 | 7/2009 | Likourezos et al. |
| 7,599,881 B2 | 10/2009 | Likourezos et al. |
| 7,606,760 B2 | 10/2009 | Hutchison et al. |
| 7,610,244 B2 | 10/2009 | Likourezos et al. |
| 7,627,528 B2 | 12/2009 | Likourezos et al. |
| 7,720,743 B1 | 5/2010 | Marks |

(Continued)

FOREIGN PATENT DOCUMENTS

JP 402202692 A * 10/1990

*Primary Examiner* — Hani M Kazimi

(74) *Attorney, Agent, or Firm* — Bruce M. Green; Oyen Wiggs Green & Mutala, LLP

(57) ABSTRACT

Existing e-commerce is carried out largely using credit card charges, which are expensive in terms of transaction charges and not particularly secure. The present invention provides an online funds transfer system which avoids transmitting sensitive information over the Internet, and utilizes the security and simplicity of the ACH system, and the benefits of pre-approved payment and debit systems. It does this by using the bank Automated Clearing House system through Pre-approved Debits and payment distributions.

17 Claims, 3 Drawing Sheets

(56) References Cited

U.S. PATENT DOCUMENTS

| | | | |
|---|---|---|---|
| 7,761,385 B2 | 7/2010 | Hutchison et al. | |
| 7,765,124 B2 | 7/2010 | Postrel | |
| 7,908,226 B2 | 3/2011 | Hutchison et al. | |
| 2002/0016769 A1* | 2/2002 | Barbara et al. | 705/40 |
| 2004/0015438 A1* | 1/2004 | Compiano et al. | 705/40 |
| 2004/0204991 A1 | 10/2004 | Monahan et al. | |

* cited by examiner

ONLINE ELECTRONIC TRANSACTION AND FUNDS TRANSFER METHOD AND SYSTEM

CROSS-REFERENCE TO RELATED APPLICATIONS

This application is a continuation-in-part of application Ser. No. 09/592,901 filed Jun. 12, 2000, which is pending.

TECHNICAL FIELD

The invention relates to the field of online transactions and more particularly to a system for the transfer of funds on payment for goods or services using the Internet.

BACKGROUND ART

Currently the majority of Internet-based commercial transactions are conducted using credit card charges. This has a number of drawbacks. The charges levied on the vendor by the banks for credit card transactions are relatively high, typically 3%. Security of the credit card numbers is a problem, and there is therefore a reluctance of consumers to make such transactions. Other online funds transfer methods have been developed, such as electronic purses or wallets, but none of these have achieved wide acceptance due to a number of factors, including cumbersome procedures, unreasonable costs and unfair assignment of risk. Consumers require a high level of trust in such online transaction systems.

Consumers are accustomed to authorizing pre-approved payments to be deducted from a chequing account for many regular payments, such as mortgage and loan payments. Such transactions, which utilize the banking Automated Clearing-House (ACH) System, are relatively secure and inexpensive. Bank authorization of such payments typically requires only a voided cheque from the consumer's designated chequing account, and the consumer's signature, and the bank charge is simply a per transaction charge. Similarly banks will transfer funds into a bank account with minimum authorization and bank charges. Fraud is rarely a problem in these transactions given the nature of the parties involved in the transactions, and consumers have come to trust these procedures.

There is therefore a need for an online funds transfer system which avoids transmitting sensitive information over the Internet, and utilizes the security and simplicity of the ACH system, and the benefits of pre-approved payment and debit systems.

DISCLOSURE OF INVENTION

The present invention therefore provides a method of conducting commercial transactions between a customer and a participating vendor over a global computer network comprising: a) providing a system manager bank account for receiving customer deposits; b) assigning the customer a customer identification number; c) maintaining an account representing the balance of funds held to a customer's credit in the system manager bank account and associating the balance with the customer identification number; d) transferring funds to the customer's credit into the system manager bank account; e) providing bank account information in relation at the participating vendor; f) communicating a proposed charge amount and the customer identification to the system manager; g) the system manager confirming the availability of funds in association with the customer identification and communicating the results of the confirmation to the vendor; h) if sufficient funds to cover the proposed charge amount are available in the system manager bank account in association with the customer identification, transferring the amount of the proposed charge amount to the vendor bank account from the system manager bank account and debiting the account of the customer. In a preferred form of the invention, the funds are transferred to the customer's credit into the system manager bank account by obtaining a customer PAD authorization in favour of the system manager.

BRIEF DESCRIPTION OF DRAWINGS

In drawings which disclose a preferred embodiment of the invention.

BEST MODE(S) FOR CARRYING OUT THE INVENTION

Figure 1:
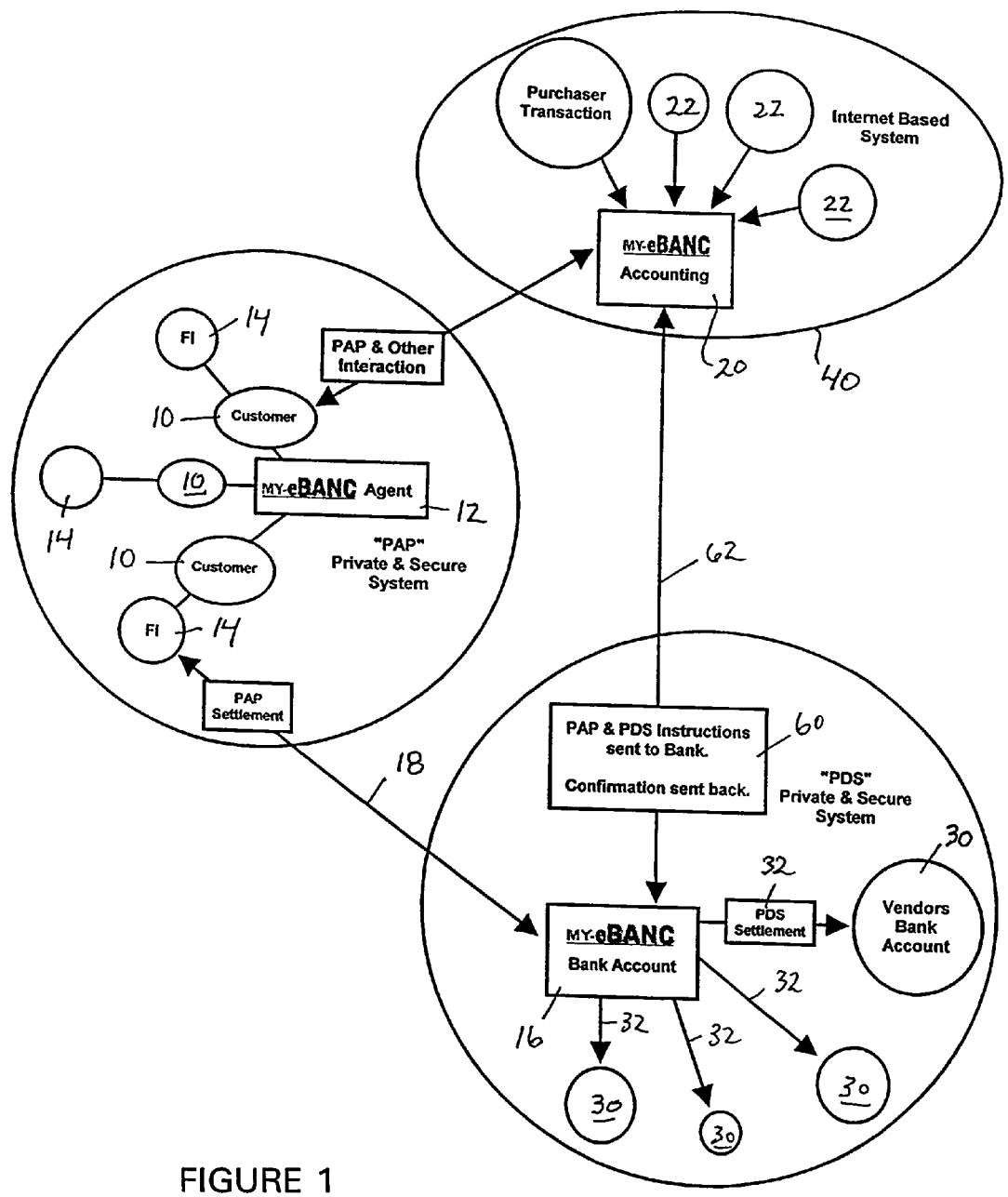
FIG. 1 is a schematic diagram illustrating the method of the invention.

With reference to FIG. 1, a customer 10 registers to use the system with an agent 12 for the electronic funds transfer system manager (referred to herein as "my-eBanc") by agreeing to an "Authorization for Pre-Authorized Debits", whether for personal and/or business purposes, as standardized, for example, by the Canadian Payments Association, whether by signing a standard form or clicking on an electronic button. Such form authorizes my-eBanc to issue Pre-Authorized Debits ("PAD") to be drawn on an account. It specifies the customer's financial institution 14 ("the Processing Institution"), such as a bank, provides a bank account number, and authorizes the issuance of a PAD by my-eBanc up to a given maximum. Such form provides that the Processing Institution is not required to verify that the terms of the Authorization have been complied with before honouring a PAD issued by my-eBanc on the designated account. The customer 10 also provides an e-mail address and selects a username and confidential password. My-eBanc then issues a unique, confidential identification number which it associates with the customer username and password, and which can be stored as an encrypted "cookie" on the customer's computer so that the customer need not always enter the password when communicating with the my-eBanc server.

While preferably this customer registration is done through a personal agent 12, it can also be done through the my-eBanc web site 20 or via a 1-800 telephone number, for example. If done through a personal or vendor agent 12, the system can be promoted by providing the agent with a commission or royalty based on the volume of sales by the customer.

In order to ensure that the account number (the RTN or Routing Transit account Number) in fact corresponds to a bank account owned by the individual purporting to own the account before the customer is given access to the my-eBanc system, the following method can be used. Upon registration the customer submits the RTN, the accuracy of which can be confirmed by requiring the customer to re-enter or confirm it. The electronic funds transfer system manager (my-eBanc) then generates a random confirmation code (RCC) consisting of a string of alpha-numeric characters, part of which identifies the source of the string and part of which is randomly generated, for example MEB145jpu840vbi, where MEB indicates my-eBanc as the source, and the balance of the string is random. The RCC is stored in database 28 along with the other customer-related information. My-eBanc then makes a nominal deposit, say $0.15, to the customer's account corresponding to the RTN using the Payment Distribution System of the ACH, and using the RCC as the reference number. Therefore on the customer's account statement the RCC will appear in the Transaction description column next to the credit column showing the $0.15 deposit. The customer is then sent an e-mail instructing the customer to obtain the RCC from his or her bank statement (which is frequently accessible on-line to the customer) and enter it in the my e-Banc web site. For example the customer is instructed as follows:

1. Get the 15-character alphanumeric code starting with MEB from your bank account statement that corresponds to a $0.15 deposit.
2. Go to the following web link www.my-eBanc.com.
3. Enter your user name.
4. Enter your password.
5. Enter the 15-character code.

The code entered by the customer is then compared to the code stored in database 28 for the customer and, if identical, the customer is given access to the my-eBanc system. If the codes are different, the customer is asked to re-enter it and the codes are compared again. This process is repeated a limited number of times. If the customer does not achieve a match, then the session is terminated and the customer is instructed to commence the process again by re-submitting an RTN number, and the foregoing process is repeated.

To commence using the system, the customer 10 authorizes a PAD in a specific amount, e.g. $1,000 to be issued to my-eBanc and my-eBanc causes the Processing Institution 14 to transfer such funds from the designated account to my-eBanc's bank account 16 utilizing the ACH system, as indicated by transfer line 18. The customer is then credited the amount of the transfer, by reference to its customer identification number, in the customer credit database 28 (see FIG. 2). Subsequently, the customer can instruct my-eBanc to transfer funds from the customer's account to my-eBanc's bank account 16 utilizing the ACH system, either through the agent 12 or through the my-eBanc web site. The customer will do this whenever additional funds are required to cover its on-line transactions. The customer can also request my-eBanc to return funds at any time to the customer bank account which my-eBanc will do through the Payment Distribution System of the ACH.

Similarly, participating vendors are required to register for the system as follows. Again, the vendor registration is preferably done through a personal agent 12, but it can also be done through the my-eBanc web site 20 or via a 1-800 telephone number, for example. The vendor provides the vendor's bank account information for the purpose of receiving deposits through the ACH into the vendor's bank account 30, as well as an e-mail address. The vendor also provides an Internet web site 22 at which the customer 12 can view and select for purchase digital or physical goods or services. However the invention can also be utilized to pay for goods or services delivered at a physical location, or over the telephone or other communication system. Where a vendor web site is the location for purchase of goods or services, the vendor is provided with software which will interface with the my-eBanc web site.

To carry out a purchase of goods or services over the Internet or other global computer network 40 using the system of the present invention, the customer accesses the Internet web site 22 of the my-eBanc registered vendor and orders the desired goods or services. Upon selecting "my-eBanc" as the method of payment, the my-eBanc software calls up a my-eBanc web page to the customer and invites the customer to enter its username and password, or just its username where the customer identification has been stored in a cookie, and clicks on a button to authorize the transaction. Using the software provided by my-eBanc, the vendor's site then communicates with the my-eBanc web site server 46 and provides the amount of the purchase and the vendor identification number. The my-eBanc server 48 then checks the identity of the customer, the value of the transaction, and confirms in database 28 that adequate funds are available to the customer's credit in the my-eBanc account 16. The my-eBanc server 46 then sends electronic instructions to the vendor either confirming that the transaction can proceed or advising that the transaction cannot proceed. If the funds are available, my-eBanc issues a Payment Distribution System instruction to transfer the amount of the transaction from the my-eBanc account to the vendor's bank account 30, and the vendor downloads the electronic goods to the customer, or ships the physical goods. The Payment Distribution System instructions are issued over secure communication lines, whether telephone or web-based, to the ACH, and the financial institution processes the transaction overnight, causing the settlement of funds 32 to be made. My-eBanc then sends a confirming e-mail to the vendor and customer confirming the transfer of funds and records a debit in that amount against the customer's credit in database 28 (see FIG. 2).

Cross-border transactions where the currency of the vendor differs from the currency of the customer's account can also be conducted. The my-eBanc web site 46 checks the currency of the vendor's destination for payment, checks the current conversion rate from the customer's currency to the vendor's currency, and determines the equivalent amount to be charged to the customer account for the transaction. If sufficient funds are in the my-eBanc account to the customer's credit, my-eBanc instructs the ACH to withdraw the funds in the calculated amount from the my-eBanc account and to transfer the appropriate amount of foreign currency to the vendor account.

Figure 2:
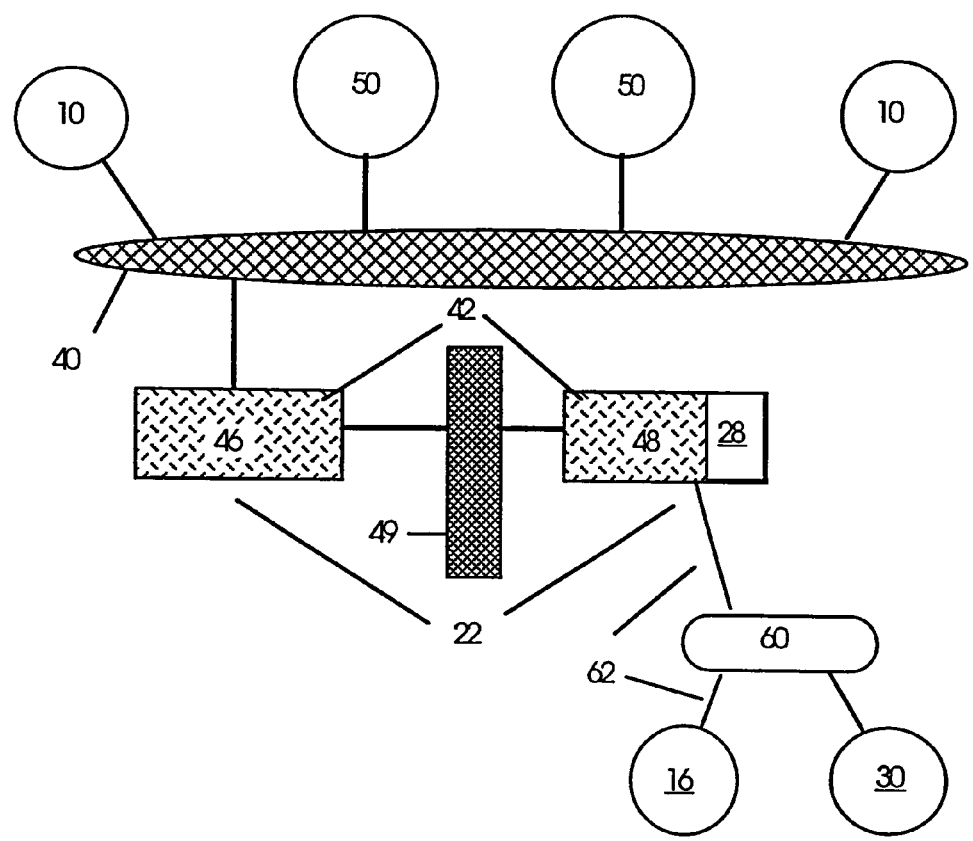
FIG. 2 is a schematic illustration of a computer network for carrying out the invention.
Figure 3:
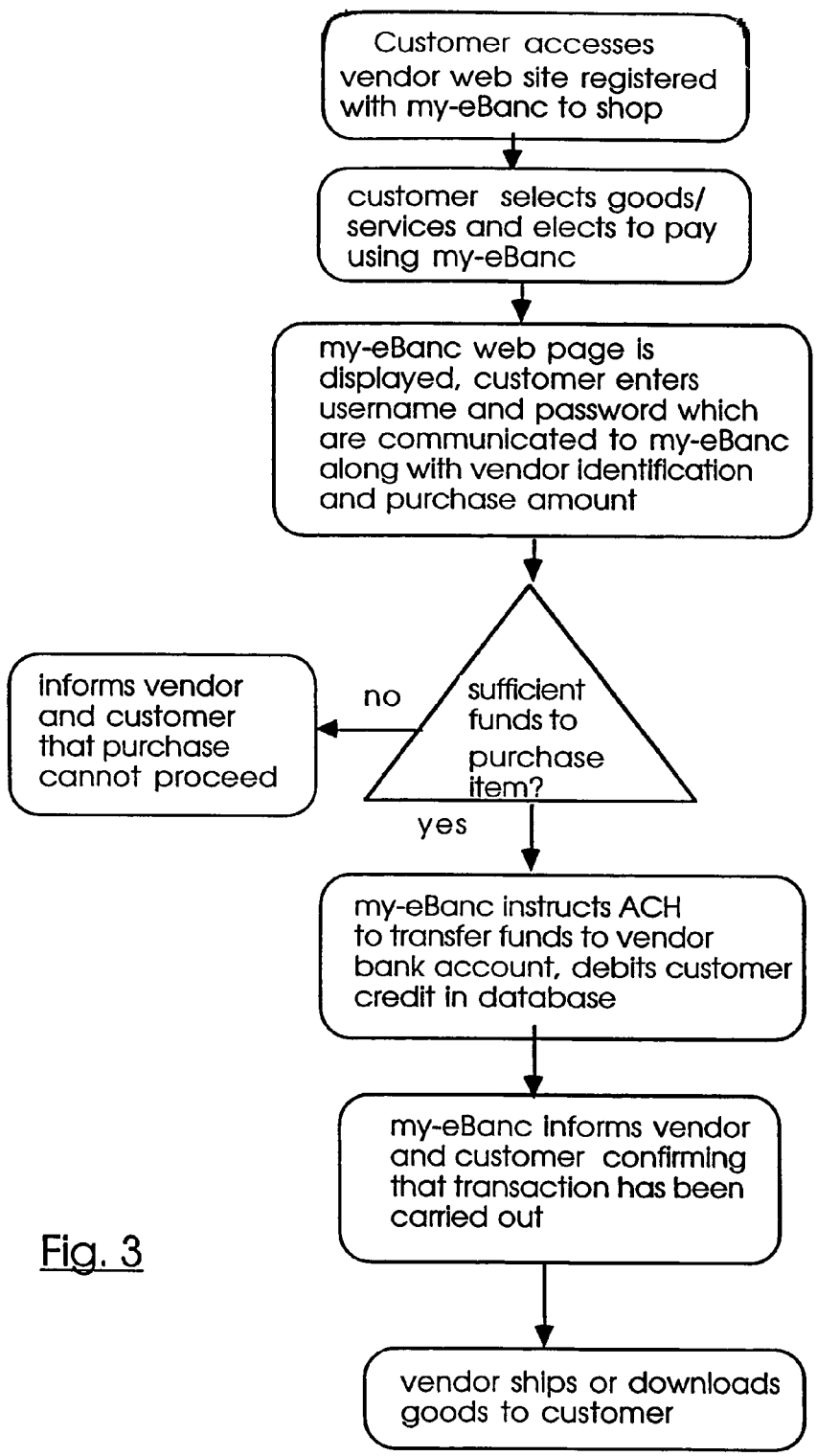
FIG. 3 is a flowchart illustrating the method of the invention.

With reference to FIG. 2, the my-eBanc web site 22, for example at the URL www.my-ebanc.com, consists of a web server 42, comprising web server 46 accessible to the Internet 40. Customers 10 and vendors 50 have access to the Internet network 40 via remote client terminals using available Internet browser software. Web server 42 also includes a secure server 48 including account information databases such as customer credit database 28, and which is protected from the Internet access by firewall 49 but can communicate with server as well as Automatic Clearing House 60, which in turn communicates with financial institutions 16, 30 by secure communication lines 62. Firewall 49 reduces the possibility that hackers can access or alter account information.

Physical Purchases

According to a second variant of the invention, a customer can use the system of the invention to pay for goods or services at a physical location through a web-accessible terminal 50 having access to the Internet, either a vendor's terminal or a customer's wireless device. The customer enters its username and password confidentially onto the my-eBanc web site and the vendor transmits the transaction through the my-eBanc web site as noted above. The vendor provides the amount of the transaction. The vendor identification can be entered manually or automatically from a "cookie" on a vendor's terminal 50.

The method of ensuring that an account number in fact corresponds to a the account owned by the individual purporting to own the account, as described above, also has application to other systems such as credit card charge systems where it is desirable to pre-confirm the validity of the account number. In many situations, both online and offline, a customer will authorize a regular payment to be billed to a credit card. The validity of the credit card account can be verified in a one-time method as was described above. When the customer submits the card number, the customer can first be requested to re-enter or confirm it. The credit card system manager then generates the random confirmation code (RCC) consisting of a string of alpha-numeric characters, part of which identifies the source of the string and part of which is randomly generated. The RCC is stored in a database along with the other customer-related information. The credit card manager then makes a nominal credit, say $0.15, to the customer's account corresponding to the account number, using the RCC as the transaction description or reference. Therefore on the customer's account statement the RCC will appear in the Transaction Description column next to the Amount (CR=credit) column showing the $0.15 credit. The customer is then sent an e-mail instructing the customer to view its account statement, which is frequently accessible on-line to the customer, to obtain the RCC corresponding to the $0.15 credit and enter it in the credit manager's web site. For example the customer is instructed as follows:

1. Get the 15-character alphanumeric code starting with XXX from your account statement that corresponds to a $0.15 credit
2. Go to the following web link www.visa.com.
3. Enter your user name.
4. Enter your password.
5. Enter the 15-character code.

The code entered by the customer is then compared to the code stored in database 28 for the customer and, if identical, the customer's transaction is approved. If the codes are different, the customer is asked to re-enter it and the codes are compared again. This process is repeated a limited number of times. If the customer does not achieve a match, then the session is terminated and the customer is instructed to commence the process again by re-submitting another card number, and the foregoing process is repeated. This method will be less useful for single merchant transactions, but is particularly useful where a regular charge is desired to be made to a credit card.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of conducting a plurality of purchases of goods or services of variable amounts by a customer from one or more participating vendors over a computer network using a system manager, said customer having a customer bank account at a financial institution and said participating vendors each having a vendor bank account at a financial institution, said customer and vendor bank accounts being accessible through the Automated Clearing House system, comprising:

a) providing an intermediary bank account at a financial institution for receiving customer deposits, said intermediary bank account being accessible through the Automated Clearing House system;

b) assigning said customer a customer identification number;

c) maintaining an account representing the balance of funds held to said customer's credit in said intermediary bank account and associating said balance with said customer identification number;

d) providing a Pre-Authorized Debit authorization to said system manager to draw funds from said customer bank account, whereby said authorization permits said financial institution holding said customer bank account to honor a Pre-Authorized Debit issued by said system manager on said customer bank account permitting said system manager to draw funds from said customer bank account without said financial institution holding said customer bank verifying that terms of said authorization have been complied with before said funds are released;

e) said customer instructing the system manager to make a first Pre-Authorized Debit payment to thereby transfer funds from said customer bank account to said customer's credit in said intermediary bank account in association with said customer identification number;

f) communicating over said computer network a proposed purchase amount in respect of a first purchase of goods or services by said customer from a participating vendor, an identification of the vendor to receive said proposed purchase amount and said customer identification number to said system manager;

g) said system manager confirming the availability of funds to cover said proposed purchase amount in said intermediary bank account in association with said customer identification number and communicating over said computer network confirmation to said vendor that the proposed purchase can proceed;

h) if sufficient funds to cover said proposed purchase amount are available in said intermediary bank account in association with said customer identification number, transferring the amount of said proposed purchase amount to said vendor bank account from said intermediary bank account and debiting the account of said customer in said intermediary bank account and confirming said transfer to said customer and said vendor;

i) communicating over said computer network proposed purchase amounts in respect of subsequent purchases of goods or services by said customer from one or more participating vendors, an identification of the one or more vendors to receive said proposed purchase amounts and said customer identification number to said system manager;

j) said system manager confirming the availability of funds to cover said proposed purchase amounts in said intermediary bank account in association with said customer identification number and communicating over said computer network confirmation to said one or more vendors that the proposed purchases can proceed;

k) if sufficient funds to cover said subsequent proposed purchase amounts are available in said intermediary bank account in association with said customer identification number, transferring the amount of said proposed purchase amounts to said one or more vendor bank accounts from said intermediary bank account and debiting the account of said customer in said intermediary bank account and confirming said transfer to said customer and said one or more vendors; and l) either before or after steps f)-k) said customer instructing the system manager to make one or more additional Pre-Authorized Debit payments to thereby transfer additional funds from said customer bank account to said customer's credit in said intermediary bank account in association with said customer identification number to thereby provide sufficient funds in said intermediary bank account for said first or subsequent purchases of goods or services by said customer from said one or more participating vendors.

2. The method of claim 1 wherein confirmation of the availability of sufficient funds is sent to said vendor by electronic means.

3. The method of claim 1 further comprising providing a site accessible to customers on the computer network via a plurality of client terminals and comprising a computer network accessible server and a secure server, said computer network accessible server being adapted to receive said communication of a proposed purchase amount and vendor identification from said vendor and said customer identification from said customer, and said secure server being adapted to maintain said account representing the balance of funds held to said customer's credit in said intermediary bank account and associating said balance with said customer identification number.

4. The method of claim 1 comprising the further step of confirming the identification of said customer bank account by assigning a reference code to the customer, storing said reference code, making a deposit to the customer bank account along with said reference code and having said customer obtain said reference code from said customer's bank account statement for comparison to said stored reference code.

5. The method of claim 1 comprising the further step of confirming the identification of said customer bank account wherein said customer bank account has a Routing Transit account Number, comprising:
   i) generating a reference code corresponding to said Routing Transit account Number;
   ii) storing said reference code,
   iii) said system manager making a deposit to said customer bank account along with said reference code;
   iv) displaying said reference code on said customer's bank account statement;
   v) having said customer obtain said reference code from said customer's bank account statement and communicating said obtained reference code to said system manager; and
   vi) comparing said obtained reference code to said stored reference code.

6. The method of claim 1 wherein an agent obtains said Pre-authorized Debit authorization from said customer.

7. The method of claim 4 wherein said identification of a customer bank account is a Routing Transit account Number.

8. The method of claim 1 further comprising having said customer instruct the system manager to make a Pre-Authorized Debit payment from said customer bank account to said intermediary bank account prior to commencing any purchases of goods or services by said customer from a participating vendor.

9. The method of claim 3 wherein said instructions to make a Pre-Authorized Debit payment are made by said customer at one of said client terminals.

10. The method of claim 1 wherein said instructions to make a Pre-Authorized Debit payment are made by said customer through an agent.

11. The method of claim 1 wherein said transfer of funds to said vendor bank account is made by a Payment Distribution System instruction.

12. The method of claim 1 wherein said transfer of funds from said customer bank account to said intermediary bank account is made using the Automated Clearing House system.

13. The method of claim 11 wherein said transfer of funds to said vendor bank account is made using the Automated Clearing House system.

14. The method of claim 1 further comprising transferring funds to said customer bank account from said intermediary bank account using the Automated Clearing House system.

15. The method of claim 1 comprising the further step of converting said proposed purchase amount from a currency different from the currency of said funds in said intermediary bank account in association with said customer identification number to the currency of said funds in said intermediary bank account in association with said customer identification number prior to determining if sufficient funds to cover said proposed purchase amount are available in said intermediary bank account.

16. The method of claim 15 wherein said reference code is an alphanumeric string comprising randomly generated alphanumeric characters.

17. The method of claim 1 comprising the further step of said customer instructing the system manager to make a Payment Distribution System payment to thereby return funds from said intermediary bank account to said customer bank account.

* * * * *